(12) United States Patent
Kimura et al.

(10) Patent No.: US 6,371,359 B1
(45) Date of Patent: Apr. 16, 2002

(54) STAINLESS STEEL PIPE AND JOINING METHOD THEREOF

(75) Inventors: Yutaka Kimura; Koji Nakamura, both of Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/538,452

(22) Filed: Mar. 30, 2000

(30) Foreign Application Priority Data

Apr. 2, 1999 (JP) .............................. 11-097060

(51) Int. Cl.[7] .............................. B23K 37/02; B23K 9/16
(52) U.S. Cl. .......................................... 228/175; 219/74
(58) Field of Search ........................... 228/175; 219/74, 219/137 R, 121.69, 59.1

(56) References Cited

U.S. PATENT DOCUMENTS

| | | | | |
|---|---|---|---|---|
| 3,666,910 A | * | 5/1972 | Anderson | 219/107 |
| 3,780,256 A | * | 12/1973 | Mara et al. | 219/121 |
| 3,922,517 A | * | 11/1975 | Nelson et al. | 219/61 |
| 4,034,179 A | * | 7/1977 | Koshiga et al. | 219/74 |
| 4,163,516 A | * | 8/1979 | Burkhart et al. | 228/114 |
| 4,280,040 A | * | 7/1981 | Gilkison | 219/104 |
| 4,300,031 A | * | 11/1981 | Redoux et al. | 219/10.41 |
| 4,367,838 A | * | 1/1983 | Yoshida | 228/112 |
| 4,528,436 A | * | 7/1985 | Stol | 219/74 |
| 4,681,349 A | * | 7/1987 | Press et al. | 285/55 |
| 4,767,911 A | * | 8/1988 | Maram et al. | 219/130.01 |
| 4,866,246 A | * | 9/1989 | Church | 219/137 R |
| 5,536,050 A | * | 7/1996 | McDermott et al. | 285/286 |
| 5,804,792 A | * | 9/1998 | Paskell | 219/137 WM |
| 5,900,079 A | * | 5/1999 | Ono et al. | 148/519 |

* cited by examiner

Primary Examiner—Tom Dunn
Assistant Examiner—L. Edmondson
(74) Attorney, Agent, or Firm—Merchant & Gould P.C.

(57) ABSTRACT

A stainless steel pipe which prevents a gas supplied through the pipe from being contaminated so as to maintain high degree of purity, the stainless steel pipe having a superior corrosion resistance so appropriate as to supply the gas for manufacturing semiconductors. According to the present invention, there are provided a stainless steel pipe and a joining method thereof regarding joining by butt welding, the stainless steel pipe comprising a joining portion 1 having a butt joining portion 2, the butt joining portion having an outer butt joining portion 2a in an outer wall surface portion 3 joined by a butt welding with penetration welding portion W and, an inner butt joining portion 2b in an inner wall surface portion joined in solid-state without being melted, such that the joining portion comprises the butt joining portion joined by the butt welding with partial penetration.

4 Claims, 3 Drawing Sheets

STAINLESS STEEL PIPE AND JOINING METHOD THEREOF

BACKGROUND OF THE INVENTION

1. Field of the Invention

The present invention relates to a stainless steel pipe and a joining method thereof adapted for use in a semiconductor manufacturing apparatus. A pipe or the like for supplying a gas thereto, where mixing of impurities made of oxides or the like generated by contacts with an inner wall of a pipe, must be extremely prohibited.

2. Description of the Prior Art

Since a gas used in a semiconductor manufacturing apparatus or a pipe for supplying a material gas thereto has a strong corrosiveness, a stainless steel having a high corrosion resistance has been frequently used in an apparatus or a pipe, contacting the gas. TIG welding (Tungsten Inert-Gas arc welding) has been generally used in such welding for joining where stainless steel pipes are connectively arranged at a predetermined length.

In semiconductor manufacturing facilities or pipes annexed thereto for providing a gas thereto, it is preferable there exists as much as possible no unnecessary space referred to as "dead space" in a channel pipe with the gas passing therethrough. That is to say, if there exists a dead space in the pipe, dust or particles accumulate in the dead space such that the particles are detached therefrom due to some shock thereby being contained within a passing gas and then discharged therewith.

If there exists a dead space in such a pipe when a corrosive gas is supplied therethrough, it is difficult to remove water existing in the dead space and a corrosive gas is dissolved in the water to thereby facilitate arousing a crevice corrosion. If crevice corrosion occurs, metallic corrosive products come to be exfoliated from an inner wall and become impurities to thereby contaminate the gas.

A dead space is frequently generated during installation of piping or manufacturing facilities, especially during a welding process for connection. For example, in case a welded portion for connecting of stainless steel pipes lacks of penetration, there remains an unmelted butt joining portion in an inner wall surface portion of a welded portion of a pipe so that a microscopic cavity thereof becomes dead space. It has been thus required to carry out a welding with complete penetration such that welded metal for welding reaches an inner wall surface of a welded portion.

However, it has been recently known that if welded metal reaches an inner wall surface of a welded portion of a pipe, ultramicroscopic metallic particles referred to as fume are generated from the welded metal toward the inside of a pipe so that the particles become a cause to contaminate a passing gas.

Even though it has been required to use a stainless steel pipe of a low impurity content and a high price due to the above-mentioned problem, there still remains the problem of generation of fume.

Moreover, since there exist welded metal and a heat-affected zone, of a low corrosion resistance in a welded portion with complete penetration, there remains another problem of generating corrosion in that region.

The present invention is provided to solve the above-mentioned problems and it is an object of the present invention to provide a stainless steel pipe which prevents dead space from being generated on an inner wall surface portion of a joining portion thereof and prevents gas from being contaminated by fume of metallic particles generated from a welded portion of a pipe such that passing gas to be supplied is not contaminated by impurities. It is still another object of the present invention to provide a stainless steel pipe having excellent corrosion resistance in a joining portion. It is still another object of the present invention to provide a joining method for obtaining the above-mentioned pipes.

SUMMARY OF THE INVENTION

According to the present invention, there is provided a stainless steel pipe joined by butt welding, the stainless steel pipe comprising: a joining portion having a butt joining portion; the butt joining portion having an outer butt joining portion in an outer wall surface portion joined with penetration; and, an inner butt joining portion in an inner wall surface portion joined in solid-state without being melted such that the joining portion comprises the butt joining portion joined by the butt welding with partial penetration.

Moreover, there is also provided a stainless steel pipe as defined above, wherein a dimension $t_s$ of the unmelted inner wall surface portion in solid-state is set within the range of $0 < t_s \leq 0.7$(mm) starting from the inner wall surface as a reference surface toward the outer wall surface with regard to a thickness t when the thickness t of the stainless steel pipe is more than 1 mm.

Moreover, there is provided a stainless steel pipe as defined above, wherein the dimension $t_s$ of the unmelted inner wall surface portion in solid-state is set within the range of $0 < t_s < 0.7$(mm) starting from the inner wall surface as a reference surface toward the outer wall surface with regard to a thickness t when the thickness t of the stainless steel pipe is less than 1 mm.

Moreover, there is provided a joining method for joining a stainless steel pipe comprising the steps of attaching butt joining portions of stainless steel pipes to be joined; welding the butt joining portions under back shield gas atmosphere or vacuum surrounding such that inner wall surface portions of the butt joining portion are joined in solid-state without being melted and outer wall surface portions of the butt joining portion are joined with penetration.

Moreover, there is provided a joining method as defined above, wherein a content of an oxidative gas is less than 10 ppm under a back shielding gas atmosphere or vacuum surrounding.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

Now, a preferred embodiment according to the present invention is described with reference to FIG. 1 and FIG. 2.

Figure 1:
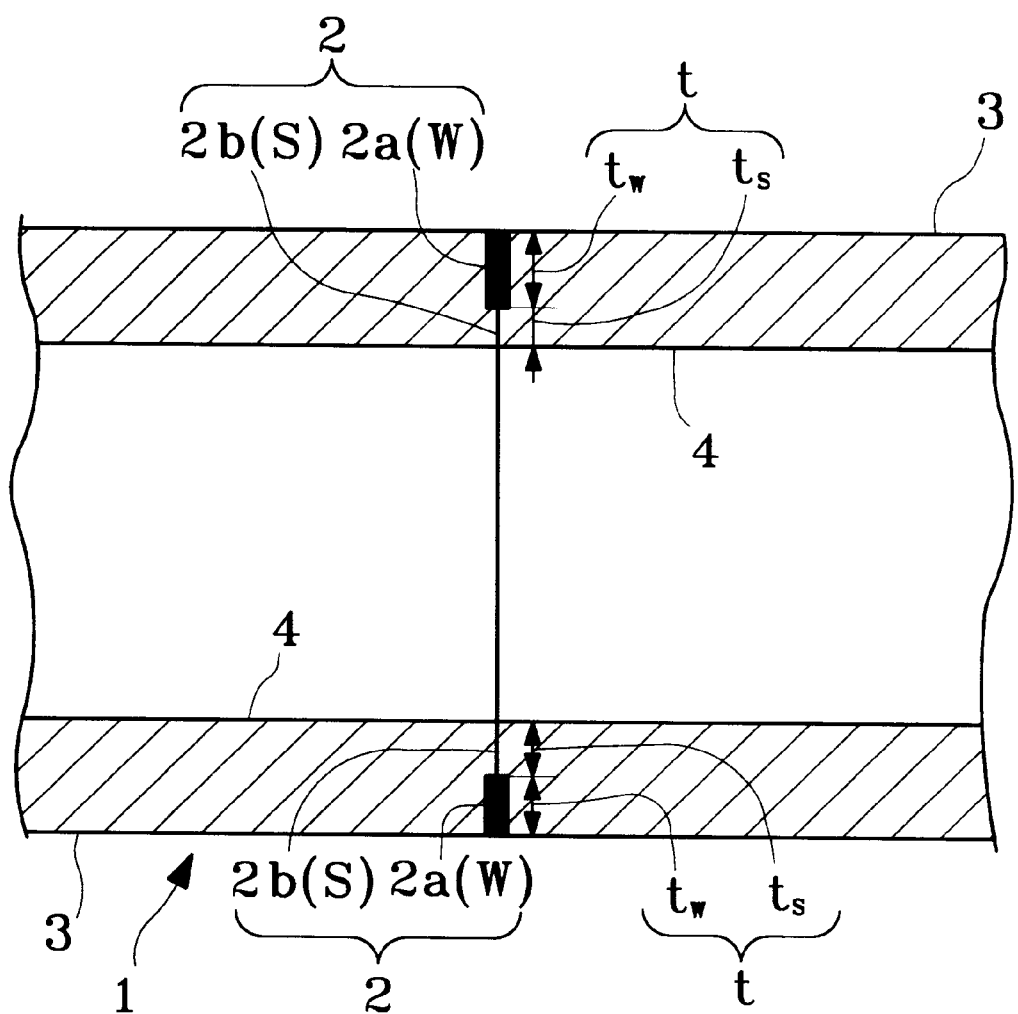
FIG. 1 is a partially enlarged cross-sectional view for illustrating a joining portion of a stainless steel pipe according to the present invention dissected along the axial direction thereof.
Figure 2:
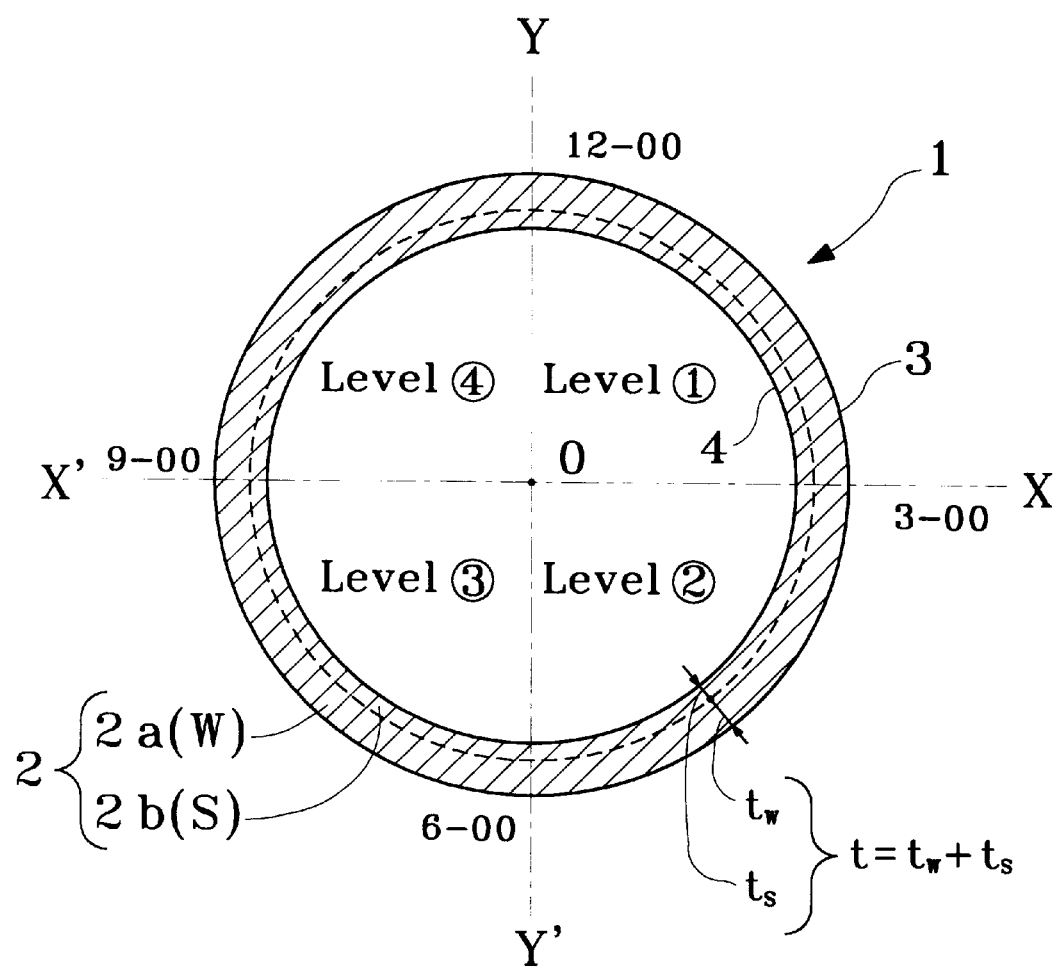
FIG. 2 is a cross-sectional pattern view for illustrating a joining portion of a stainless steel pipe according to the present invention dissected along the diametrical direction thereof.

FIG. 1 is a partially enlarged cross-sectional view for illustrating a joining portion of a stainless steel pipe according to the present invention dissected along the axial direction thereof and FIG. 2 is a cross-sectional pattern view for illustrating a joining portion of a stainless steel pipe according to the present invention dissected along the diametrical direction thereof The stainless steel pipe joined by butt welding, comprises: a joining portion having a butt joining portion; the butt joining portion having an outer butt joining portion in an outer wall surface portion joined with penetration; and, an inner butt joining portion in an inner wall surface portion joined in solid-state without being melted such that the joining portion comprises the butt joining portion joined by the butt welding with partial penetration. It is thus possible to obtain a stainless steel pipe closely joined without forming a dead space or generating fume on the inner wall surface 4 of the pipe.

Furthermore, the butt welding with penetration is carried out in such a manner that a dimension $t_s$ of the unmelted inner wall surface portion (unmelted butt joining portion 2b) in solid-state is set within the range of $0 < t_s \leq 0.7$(mm) starting from the inner wall surface 4 in butt joining portion 2 as a reference surface toward the outer wall surface 3 in welding the joining portion 2 by injecting arc from the outer wall surface 3 toward inner wall surface 4 especially when the thickness t of the stainless steel pipe is more than 1 mm. Then, the penetration depth $t_w$ of the outer wall surface portion (butt joining portion with penetration 2a) is set within the range of $0.3 < t_w \leq 1$(mm) starting from the outer wall surface 3 as a reference surface toward the inner wall surface 4. It is thus possible to obtain a stainless steel having a solid-state joining portion S formed by pressure welding, the stainless steel pipe preventing dead space from being formed on the inner wall surface 4 of the butt joining portion 2 and further preventing fume from being generated on the joining portion of the inner wall surface portion 2b.

Furthermore, the butt welding with penetration is carried out in such a manner that the dimension $t_s$ of the unmelted inner wall surface portion (unmelted butt joining portion 2b) in solid-state is set within the range of $0 < t_s < 0.7 \times t$(mm) starting from the inner wall surface 4 in butt joining portion 2 as a reference surface toward the outer wall surface 3 when the thickness t of the stainless steel pipe is less than 1 mm. Then, the penetration depth $t_w$ of the outer wall surface portion (butt joining portion with penetration 2a) is set within the range of $1 \times t > t_w \geq 0.3 \times t$(mm) starting from the outer wall surface 3 as a reference surface toward the inner wall surface 4. It is thus possible to obtain a joining portion of a stainless steel pipe having solid-state joining portion S formed by pressure welding, which can prevent a dead space from being formed on the inner wall surface 4 of the butt joining portion 2 and moreover prevent fume from being generated.

Furthermore, in a joining method for obtaining the above-mentioned stainless steel pipe in carrying out a butt welding of the stainless steel pipe, the method comprises the steps of attaching butt joining portions of stainless steel pipes to be joined; welding the butt joining portions under back shield gas atmosphere or vacuum surrounding such that inner wall surface portions of the butt joining portion are joined in solid-state without being melted and outer wall surface portions of the butt joining portion are joined with penetration.

Furthermore, it is possible to obtain a preferable joining if surface roughness of the butt joining portion 2 of the stainless steel pipe to be joined is set below about 30 μm.

That is to say, in such solid-state joining portion S, the unmelted butt joining portions 2b are mutually pressure-welded by a stress acting toward the contacts of the pipes according to shrinking of a fusion zone of welding metal. Since a temperature of the unmelted butt joining portion 2b increases according to heat conduction from welding metal, the unmelted butt joining portion 2b is joined while maintaining solid-state and the inner wall surface portions of the pipes are closely joined without generating a dead space thereon.

Welding such as arc welding, electronic beam welding or laser welding, is rotatively carried out once or more while maintaining a penetration depth of the butt joining portion 2a(W) of the welded metal portion constant along the peripheral wall of the butt joining portion and a total quantity of heat applied is increased so as to increase heating time of the unmelted butt joining portion to thereby form solid-state joining portion S of the unmelted butt joining portion 2b more securely.

The butt welding with penetration is differently carried out according to the thickness of a pipe. It is preferable to carry out welding at a welding speed of below 600 mm/min, preferably 50–300 mm/min. Since the temperature maintaining time is shorter when the welding speed is above 600 mm/min, the unmelted joining portion 2b is insufficiently heated and it is difficult to obtain a satisfactory solid-state joining portion S. Meanwhile, as it is necessary to carry out welding in a welding condition of very low current in order to carry out for the butt welding with partial penetration which preferably forms the unmelted solid-state joining portion S at a welding speed of below 50 mm/min, it is difficult to weld stably. Furthermore, according to welding conditions, welded metal for welding in the butt joining portion 2 reaches the inner wall surface 4 like in the ordinary butt welding conditions, so it is impossible to accomplish a butt welding with partial penetration which forms the unmelted solid-state joining portion S.

In a welding work, a stainless steel pipe is preferably welded in a back shield gas atmosphere or a vacuum surrounding. If there exists an oxidative gas such as air or the like containing oxygen within a pipe, it is impossible to form the preferable solid-state joining portion S because a thick oxide coating is formed on the unmelted butt joining portion 2b where the solid-state joining portion S is to be formed. Therefor it is preferable to make the content of oxidative gas below 10 ppm.

As a back shield gas, a gas which is comprised of at least one of argon gas, nitrogen gas, helium gas or a gas with hydrogen gas added thereto, is preferably used.

Furthermore, it is preferable to carry out the butt welding with partial penetration by making a surface roughness $R_y$ of the butt joining portion 2 of the stainless steel pipe to be joined below 30 μm. If a surface roughness $R_y$ of the butt joining portion 2 is above 30 μm, joining portions are not closely adhered to each other and a void or cavity may be formed thereon. Furthermore, when a surface roughness Ry of the butt joining portion 2 is below 30 μm, it is possible to obtain a very favorable solid-state joining portion S.

According to the present invention, it is possible to drastically decrease generation of ultramicroscopic metal particles referred to as fume within a pipe, since welded metal of high temperature for welding can not reach the inner wall surface 4 of the pipe by carrying out butt welding with partial penetration under the above-mentioned condition.

Furthermore, it is possible to drastically decrease the deterioration range of corrosion resistance by heat affection, since it is possible to suppress so the temperature of the joining portion 2b in the inner wall surface of the butt joining portion 2 is to be lower than that of the butt joining portion with complete penetration. Furthermore, it is also possible to obtain a stainless steel pipe having an excellent corrosion resistance, since welded metal for welding having inferior corrosion resistance can not reach the inner wall surface 4 of the pipe. Furthermore, since residual stress may be suppressed in low level, it is also possible not only to decrease danger to cause stress corrosion cracking but also to suppress edge deformation.

Next, to establish welding conditions such that the unmelted butt joining portion 2b of the inner wall surface 4 of the pipe, is formed as a solid-state joining portion S which is a characteristic of the stainless steel pipe according to the present invention, experiments were performed as follows:

(i) To specify a penetration depth $t_w$(mm) of the butt joining portion 2a from the outer wall surface 3 (experiment 1).

(ii) To specify a welding speed (experiment 2).

(iii) To specify a welding surrounding (experiment 3).

(iv) To specify a surface roughness $R_y$ of the butt joining portion 2 (experiment 4).

Specifications and dimensions of welding apparatus and welding condition and pipes for test commonly used in experiments are as follows:

[Welding apparatus]

Automatic welding apparatus: Model No. 207 made by Arc Machine Corporation

Welding head: Model No. 750 made by Arc Machine Corporation

Power supply: pulse generator attached, pulse generating time:0.1/0.1 second

[Welding condition]

Arc length (voltage reference): 0.8 mm (8V)

Welding speed: 120 mm/min

Starting position of welding and movement thereof: to start from a clock position of 3'o clock and welding along the horizontally downward direction.

Back shield gas: argon gas 4 L/min shield gas: argon gas 10 L/min

Purge time before and after welding: more than 30 seconds

[Pipes for test]

Material: stainless steel SUS 316 L

Outer diameter: 9.53 mm(⅜ inch)

Thickness: 1 mm

[Experiment 1]

8 samples of stainless steel pipes were prepared, which were made of above-mentioned SUS 316 L having a thickness of 1 mm and an outer diameter of 9.53 mm and each of which was respectively designated as No.1–No.8. Then, welding movement was carried out with welding current values at respective levels shown in chart 1 in order to obtain respectively desired penetration depth $t_w$ mm.

Furthermore, a welding means used in this butt welding with penetration was carried out by selecting an appropriate one such as arc welding like TIG welding, laser welding, electron beam welding or the like.

Furthermore, as shown in FIG. 2, a welding by this welding method was carried out by dividing the cross-section of the butt joining portion 2 and appropriately adjusting welding currents according to the divided portion. That is to say, if a center of the cross-section of the pipe is at the origin and the cross-section is divided by two axes of (X–X') and (Y–Y') into 4 levels where the first quadrant is level ①, the second quadrant level ②, the third quadrant level ③ and the fourth quadrant level ④ respectively, then welding was started from the clock position of 3 o' clock to which axis (X–X') intersects the cross-section of the joining portion 1 of the pipe and was moved clockwise along the peripheral surface of the outer wall surface 3 of the pipe so as to move along the sequence of level ②-level ③-level ④-level ①-level ②.

The welding was carried out by appropriately adjusting welding current at the above-mentioned respective level.

[chart 1]

| Sample | No. 1 | No. 2 | No. 3 | No. 4 | No. 5 | No. 6 | No. 7 | No. 8 |
|---|---|---|---|---|---|---|---|---|
| Level ① | 17/11 | 18/11 | 19/12 | 21/13 | 23/14 | 25/15 | 25/16 | 26/16 |
| Level ② | 16/11 | 17/11 | 18/12 | 20/13 | 22/14 | 24/15 | 24/16 | 25/16 |
| Level ③ | 13/11 | 14/11 | 16/12 | 18/13 | 20/14 | 22/15 | 22/16 | 22/16 |
| Level ④ | 12/11 | 13/11 | 14/12 | 16/13 | 18/14 | 20/15 | 20/16 | 21/16 |
| Average depth of penetration $t_w$ (mm) | 0.11 | 0.20 | 0.30 | 0.37 | 0.49 | 0.70 | 0.75 | 1.00 |
| Unmelted solid-state joining portion $t_s$ (mm) | 0.89 | 0.80 | 0.70 | 0.63 | 0.51 | 0.30 | 0.25 | 0 |

Testing was carried out for identifying a variation of tensile strength T according to the difference between respective penetration depths $t_w$ obtained from the above chart.

Tensile testing was carried out with tensile tester (AG-5000D made by Shimadzu Corp.) by making the butt joining portion of test pipes respectively having length of 700 mm centered while maintaining a gap of a holding portion of 45 mm and by inserting core metal while maintaining a gap of 20 mm. The test was carried out using a load cell of 5 tons at a tension speed of 20 mm/min.

Figure 3:
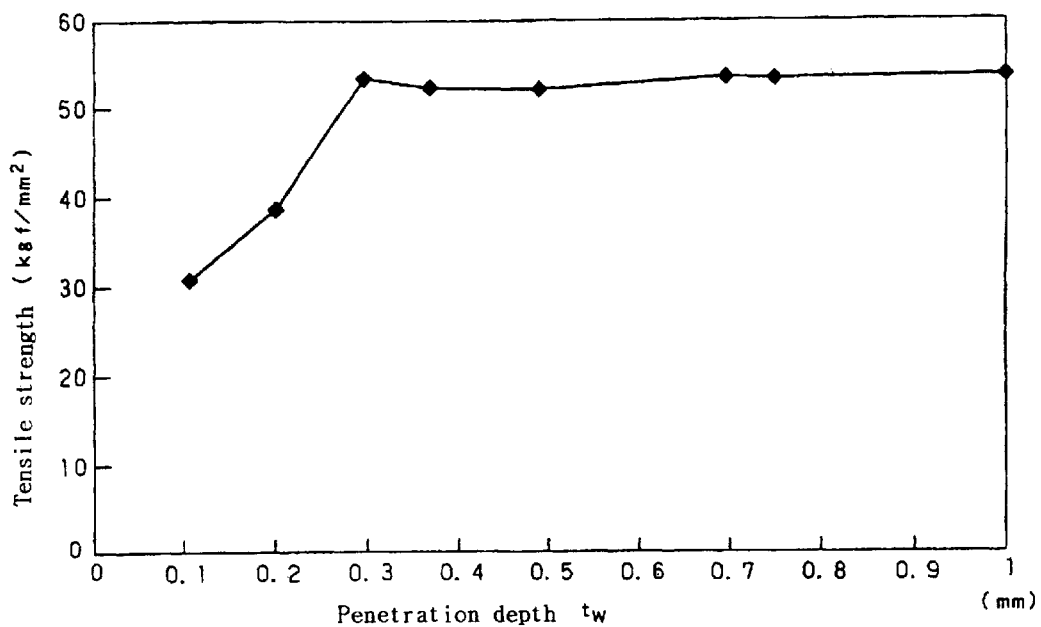
FIG. 3 is a graph showing a variation of tensile strength T to a variation of penetration depth $t_w$.

The result of the test is shown in FIG. 3 with a graph illustrating the variation of tensile strength T(kgf/mm²) to the variation of penetration depth $t_w$ (mm).

As apparent in FIG. 3, if an average penetration depth becomes 0.3 mm (30% of the thickness of the pipe to be used), tensile strength T reached about 54 kgf/mm² exceeding 50 kgf/mm². Tensile strength T was hardly increased in base of an average penetration depth $t_w$ above 0.3 mm and showed the same tensile strength T of a joining with complete penetration (penetration equal to 100% thickness of the pipe to be joined) where penetration depth $t_w$ is 1.0 mm.

Moreover, the value of tensile strength T exceeded the predetermined tensile strength of 480 N/mm²(48.89 kgf/mm²) stipulated in JIS G3459 as for a stainless steel pipe for piping.

From the above result, it was identified that if the butt joining portion 2a was formed with penetration having an average depth $t_w$ of above 0.3 mm (30% of the thickness t of the pipe to be used), solid-state joining pipe having a tensile strength T equivalent to joining with complete penetration may be obtained. That is to say, it was identified that it is preferable to carry out a welding with partial penetration such that the dimension $t_s$ of the unmelted butt joining portion 2b of the inner wall surface portion of the butt joining portion was made below 0.7 mm (70% of the thickness of the pipe to be used).

[Experiment 2]

Next, another test was carried out for identifying appropriate welding speed with which satisfactory solid-state joining portion S may be obtained.

In the experiment, pipes for the test having an outer diameter of 9.53 mm and a thickness of 1 mm were used, and welding speeds were respectively varied into three values of 15 mm/min, 120 mm/min, 600 mm/min. The welding with partial penetration was carried out with an argon gas as a back shield gas having a high degree of purity and by adjusting welding currents as shown in chart 2 so as to make a penetration depth $t_w$ of 0.3 mm. Then, testing of tensile strength of the obtained joining portion was carried out. Moreover, the tension test was carried by the same method as experiment 1. The result is shown in chart 2.

[chart 2]

| Welding speed (mm/min) | 15 | 120 | 600 |
|---|---|---|---|
| Average welding current (A) | 10 | 14 | 50 |
| Tensile strength (kfg/mm$^2$) | 53.7 | 53.6 | 52.9 |

As apparent in chart 2, it was identified that it is possible to obtain satisfactory butt joining pipe having a solid-state joining portion of 0.7 mm, an appropriate penetration depth of 0.3 mm having a value of above 480 N/mm$^2$(48.98 kgf/mm$^2$) by appropriately adjusting a welding current according to a welding speed at any welding speed. However, tensile strength obtained with a welding speed of 600 mm/min somewhat fell behind that with different welding speed. It is considered that this was because the temperature maintaining time of the solid-state joining portion was shorter due to the fast welding speed.

[Experiment 3]

Figure 4:
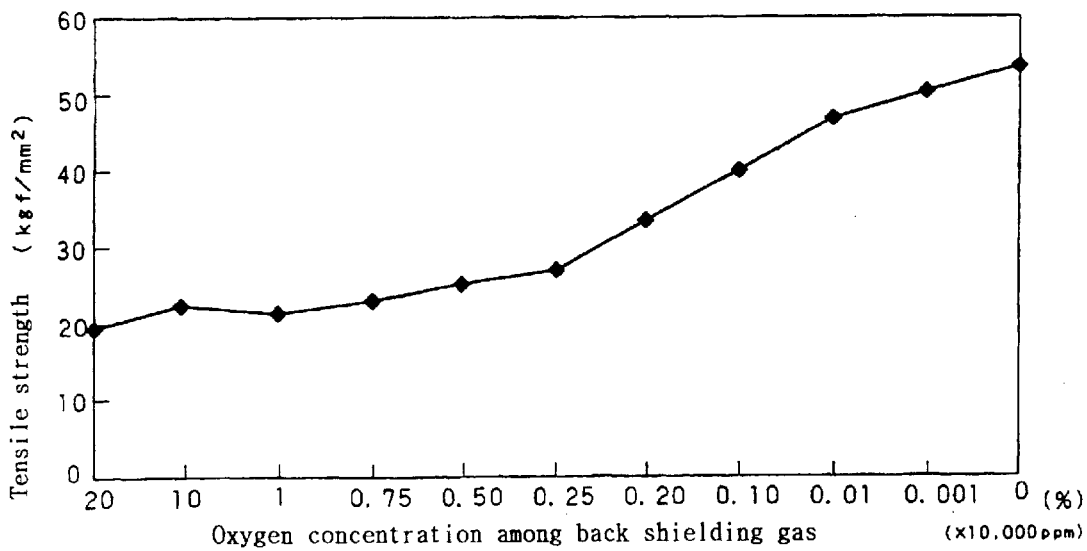
FIG. 4 is a graph showing a relation between an oxygen concentration among back shield gas and tensile strength T.

Next, an experiment with respect to the effect of back shield gas of atmosphere gas during welding, was carried out. In the experiment, pipes for the test respectively having an outer diameter of 9.53 mm and a thickness of 1 mm were used, and an argon gas having a high degree of purity as a back shield gas was used with an oxygen gas added thereto so as to make its concentration vary to 10% (10 ppm). And then, a butt welding was carried out with a welding speed of 120 mm/min such that a penetration depth $t_w$ was 0.3 mm in an argon gas atmosphere having respective oxygen concentration. Then, tension test of the obtained pipe was carried out by the same method as experiment 1. The result is shown in FIG. 4 as a graph showing a relation between an oxygen concentration among a back shield gas and tensile strength T.

As apparent in FIG. 4, it was identified that when an oxygen concentration contained in a back shield gas was above 10 ppm (0.001%), tensile strength T was at most 49 kgf/mm$^2$ and in order to securely obtain tensile strength T of above 480N/mm$^2$(48.98 kgf/mm$^2$) stipulated in JIS, the oxygen concentration must be suppressed below 10 ppm (0.001%).

Furthermore, when a cross-section of the joining portion was inspected, it was identified that the fractures of the pipes for test welded with an argon gas as back shield gas having an oxygen concentration of above 1% were entirely oxidized while the fracture of the pipes for test welded with an argon gas as a back shield gas having an oxygen concentration of above 10 ppm (0.001%) and below 1% were partially oxidized to thereby remain as a non-joining portion.

Moreover, with respect to the case that a nitrogen gas as a reducing gas (argon gas+7 volume % hydrogen gas) or an inert gas, was used as back shield gas instead of the above-mentioned argon gas of a high degree of purity, the effect due to an oxygen concentration contained in the gas was also experimented. The obtained result was the same when the above-mentioned argon gas of a high degree of purity was used. Consequently, it was identified that content of an oxidative gas like oxygen in the back shield gas must be suppressed below 10 ppm.

[Experiment 4]

Identification of the effect of surface roughness of the butt joining portion 2 in the joining portion 1 of the pipe was carried out for obtaining preferable solid-state joining portion S. In the experiment, pipes for the test having an outer diameter of 9.53 mm and a thickness of 1 mm were used. Pipes where surface roughness $R_y$ of the joining portion 2 thereof was varied, were welded by a butt welding. The welding was carried out with an argon gas of a high degree of purity and a welding speed of 120 mm/min such that a penetration depth $t_w$ was to be 0.3 mm. Then, tension test of the pipes joined with respective surface roughness was carried out by the same method as experiment 1. The result is shown in chart 3 showing variation of tensile strength according to the difference of surface roughness Ry.

[chart 3] (unit $\mu$m)

| Surface roughness $R_y$ | 52 | 38 | 29 | 20 | 3 |
|---|---|---|---|---|---|
| Tensile strength (kgf/mm$^2$) | 21 | 43 | 51 | 54 | 52 |

As apparent in chart 3, it was identified that tensile strength is increasingly varied according to the decrease of the surface roughness and surface roughness $R_y$ is needed to be made below about 30 $\mu$m of flat surface in order to securely obtain predetermined value of tensile strength of 480N/mm$^2$(48.98 kgf/mm$^2$) stipulated in JIS.

Next, in order to identify performance of a pipe according to the present invention, the stainless steel pipe as an embodiment was manufactured using a stainless steel pipe (SUS 316 L) having an outer diameter of 9.53 mm(⅜ inch) and a thickness of 1 mm according to the results of experiments 1 to 4 by forming a butt joining portion with penetration (W) melted with penetration depth $t_w$ of 0.3 mm from the outer wall surface 3 and by forming a solid-state joining portion having a dimension of unmelted portion of 0.7 mm.

Furthermore, tests of (A) observation of cross-section of welded portion, (B) tension test, (C) bending test, (D) measurement of particle-generated amount and (E) corrosion test were carried out.

Moreover, to obtain a more clear comparison between performances, a stainless steel pipe having the same specifications as the embodiment of the present invention and joined according to the conventional welding method with complete penetration was used as a pipe for testing of a comparative example. Moreover, after carrying out the above-mentioned respective test and visual inspection, the results of a performance test of the stainless steel pipe of the present invention were compared with those of a comparative example.

[Embodiment]

The stainless steel pipe according to the present invention was manufactured according to the following welding conditions:

(welding conditions)
  Arc length (voltage reference): 0.8 mm (8V)
  Welding speed: 120 mm/min
  Starting position of welding and movement thereof: starting from the clock position of 3' o clock and welding along the horizontally downward direction back shield gas: argon gas of 4 L/min having a high degree of purity shield gas: argon gas of 10 L/min having a high degree of purity Purge time before and after welding: above 30 seconds Surface roughness of the butt joining portion 2: average surface roughness ($R_{yav}$) 0.29 μm, Maximum surface roughness ($R_{ymax}$) 0.31 μm Welding apparatus: the same automatic welding machine as used in the above experiment Power supply: purse oscillator attached, purse generating time: 0.1/0.1 second Welding was carried out starting from the clock position of 3'o clock in the butt joining portion 2 shown in FIG. 2 moving along the horizontally downward direction. Welding current and welding time in respective level were adjusted according to the values shown in chart 4.

[chart 4]

| [Embodiment] | Level ① | Level ② | Level ③ | Level ④ |
|---|---|---|---|---|
| Welding method according to the present invention | 19/12A | 18/12A | 15/12A | 14/12A |
| Welding current (time) | (5.5 seconds) | (3.7 seconds) | (3.7 seconds) | (5.0 seconds) |

[Comparative example]

A stainless steel pipe having the same specifications as the embodiment of the present invention and joined according to the conventional welding method with complete penetration was used as a pipe for testing of a comparative example.

Welding conditions were made the same as with the above-mentioned embodiment. However, welding currents and welding times were adjusted according to the values shown in chart 5 such that the width of inner bead formed by the welding with complete penetration was made 2 mm.

[chart 5]

| [comparative example] | Level ① | Level ② | Level ③ | Level ④ |
|---|---|---|---|---|
| Welding method with complete penetration | 31/17A | 30/17A | 25/17A | 24/17A |
| Welding current (time) | (5.5 seconds) | (3.7 seconds) | (3.7 seconds) | (5.0 seconds) |

[Performance test]

The performance of the stainless steel pipe joined by the butt welding with partial penetration and obtained in the above-mentioned embodiment according to the present invention was compared with that of the stainless steel pipe manufactured in the comparative example and joined by the butt welding with complete penetration which has been conventionally carried out.

(A) Observation of Cross-section of Welded Portion

The stainless steel pipe according to the present invention obtained by butt welding with partial penetration having penetration depth of 0.3 mm was dissected along the longitudinal axis thereof at the butt joining portion 1 thereof and the structure of the butt joining portion 1 was observed thereafter. In result, it was identified from observation that the unmelted butt joining portion 2b (located inside of the dotted line) of the inner wall surface portion 4 of the pipe penetrates inside of crystal grains and the unmelted butt joining portions 2b were mutually joined in solid-state.

(B) Tension Test

The tension test of the stainless steel pipe joined by the butt welding with partial penetration and obtained in the above-mentioned embodiment according to the present invention and that of the stainless steel pipe joined by the butt welding with complete penetration which has been conventionally carried out were carried out according to the following points of tension test.

(Points of tension test)

Length of test pipe: 700 mm

Gap between holding positions: 45 mm

Gap of inserted core metal: 20 mm

Tension speed: 20 mm/min

Load cell: 5 tons

AC-5000D made by Shimadzu Corp. was used as a tension testing machine and 3 samples were prepared and tested. The result of the test was shown in chart 6) together with tensile strength of base metal.

[chart 6] (unit kgf/mm²)

| | Base metal | Welding method according to the present invention (Embodiment) | Welding method With complete penetration(Comparative example) |
|---|---|---|---|
| Average value of tensile strength | 54.3 | 53.6 | 53.7 |
| Maximum value of tensile strength | 54.4 | 54.4 | 54.0 |
| Maximum value of tensile strength | 54.1 | 52.1 | 53.4 |

As apparent in chart 6 tensile strength of the stainless steel pipe of the embodiment according to the present invention joined by the butt welding with partial penetration was 52.1 to 54.4 kgf/mm², which is somewhat inferior to the tensile strength of the base metal of 54.1 to 54.3 kgf/mm², but matches the tensile strength of 53.4 to 54.4 kgf/mm² of the stainless steel pipe joined by the conventional butt welding with complete penetration and obtained in the comparative example. Moreover, the value exceeded the predetermined 480N/mm²(48.98 kgf/mm²) stipulated in JIS so that it was identified that the values are good enough to be used.

Furthermore, in the above-mentioned tension test, the butt joining portion 2 was fractured by applying load thereto and the fracture was inspected by a scanning electron microscope (SEM). It was identified that the remaining open-end surface(unmelted butt joining portion (2a)) was covered by dimples and was in a state where temperature rising in the joining portion 2 due to heat conduction during welding, heat expansion in the joining portion 2 due to the temperature rising and shrinking, and stress according to solidification of the fusion zone, were mutually entangled to thereby form solid-state butt joining portion S where the unmelted butt joining portion 2b of the butt joining portions 2 was pressure-welded. Furthermore, it was identified that the cutting trace created during cutting of the pipe at the unmelted butt joining portion 2b of the butt joining portion 2 had disappeared and the unmelted butt joining portions 2b were mutually and completely joined in solid-state.

Furthermore, since the stainless steel pipe of the comparative example was welded by a conventional method, it was merely identified by appearance whether a butt welding with complete penetration was properly carried out or not.

(C) bending test

A pipe wall of the joining portion of the stainless steel pipe joined by a butt welding with partial penetration according to the present invention and manufactured in the embodiment, was cut (by about ¼ of circumference thereof) along the axial direction of the pipe in a small oblong shape and bent outwardly about 180° using the butt joining portion with penetration 2a in outer wall surface portion 3 as a supporting point. External force was applied on the unmelted butt joining portion as to open the joining portion. However, it was identified that the unmelted butt joining portion 2b was not exfoliated in spite of carrying out this experiment, even not opened and the unmelted butt joining portion 2b was formed in firm solid-state.

(D) Measurement of particle-generated amount

Next, with respect to each case of the stainless steel pipe joined by a butt welding with partial penetration and obtained in the above-mentioned embodiment according to the present invention and the stainless steel pipe joined by a butt welding with complete penetration which has been conventionally carried out, the amount of fume generated during welding was measured with testing point shown in chart 7 by using a particle counter counting particles among the back shield gas directed to inside of the pipe during respective welding.

[chart 7]

| | |
|---|---|
| Particle counter | UCPC-2010 made by KANOMAX |
| Maximum value of a measured particle diameter | 3 nm |
| Maximum value of a measured particle number | 100000/cm³ |
| Measuring method | Suction method of uniform velocity |
| Inner diameter of a diffusion pipe | 7.53 mm |
| Inner diameter of a suction pipe | About 1.7 mm |
| Flux of back shield gas | 11.7 l/min |
| Suction amount | 1.5 l/min |

Furthermore, when the peripheral wall of the pipe was welded one time along the peripheral direction thereof according to the butt welding of the usual condition shown, a great number of particles were generated and the number of particles were beyond a particle counter. Thus, the number of particles was measured by ending welding when the welding was partially carried out with ¼ of peripheral wall of the pipe and by increasing flux of back shield gas up to 27 L/min. Finally, the total number of particles was counted by converting the original number into the total value for the complete welding after the measurement.

In result, in case of the butt welding with partial penetration of the embodiment according to the present invention, the average value of particle number over the three times of tests was 8.128/cm³.

On the other hand, in case of the conventional butt welding with complete penetration of the comparative example, the average value of particle number over three times of tests was 208.569/cm³. That is to say, it was identified that the joining method according to the present invention has a superior advantage in that the particle-generated amount in joining by the butt welding with partial penetration according to the present invention may be drastically decreased up to 4% of that in joining by the conventional butt welding with complete penetration.

(E) Corrosion Test

Next, corrosion tests of the butt joining portion of the stainless steel pipe of the embodiment manufactured according to the present invention and that of stainless steel pipe of the comparative example manufactured by the conventional method were carried out. A testing point was that the corrosion amount was quantitatively analyzed after corroding respectively the joining portions in the corrosion atmosphere shown in chart 8.

[chart 8]

| | |
|---|---|
| Corrosion medium | Nitrogen gas + 50% hydrogen chloride |
| Water concentration | 100 ppm |
| Pressure | 1.5 × 10⁵ Pa |
| Time | 168 hours |
| Testing temperature | 298K |

After the quantitative analysis of the corrosion amount was carried out in the corrosion atmosphere shown in chart 8, ascetic acid of 5% was injected to the corroded inner portion and by maintaining the corroded inner portion for 5 minutes corrosion product through exudation was obtained. Then, the exudated metal element was quantitatively analyzed.

Furthermore, the exudated element from the base metal product (not exposed in the corrosion atmosphere shown in chart 8) on which the corrosion test was not carried out, was obtained as a reference and quantitatively analyzed in the same manner as the above-mentioned exudating method.

The analyzed elements were chromium(CR), nickel(Ni) and iron(Fe) which are the principal elements of stainless steel and manganese(Mn) of melted fume element.

Furthermore, analyzing apparatus used as analyzing means was operated by using Induced Combination Plasma-Emission Spectrochemical analysis (ICP-MS) for analyzing elements of Chromium(Cr), Nickel(Ni) and manganese (Mn), and by using Atomic Absorption Spectroscopy (AAS) for analyzing the element of iron(Fe).

The result is shown in chart 9.

[chart 9] (unit µg)

| | Mn | Cr | Ni | Fe | Total |
|---|---|---|---|---|---|
| Base metal | 0.021 | 6.13 | 5.47 | 22.55 | 33.67 |
| Welding method of the present invention (embodiment) | 0.029 | 7.12 | 5.30 | 29.75 | 42.20 |
| Welding method with complete penetration (comparative example) | 1.200 | 11.17 | 14.10 | 63.93 | 90.40 |

In the amount of the exudated metal shown in chart 9, note that when the amount of the exudated metal was set as a reference, the amount value of the exudated metal of the respective metal element exudated from the test pipe of the stainless steel pipe of the embodiment according to the present invention joined by the butt welding with partial penetration and that of the respective exudated metal element exudated from the test pipe of the stainless steel pipe of the conventional butt welding with complete penetration were greater than that of the base metal. This is due to the fact that the surfaces of the test bars of the embodiment and the comparative example were contaminated by welding or by the generation of fume or the formation of unstable metal surface.

As apparent in chart 9, since the stainless steel pipe of the embodiment according to the present invention joined by the butt welding with partial penetration was processed by welding, it is natural for the amount of the respective exudated metal to be greater than the amount of the respective exudated metal exudated from the base metal but there was not so big a difference between them in the amount of the exudated metal.

On the other hand, in the stainless steel pipe of the comparative example joined by the conventional butt welding with complete penetration, it was understood that the amount of the exudated metal was comparatively much bigger than the amount of the exudated metal from the base metal. Especially, the increase of the metal element Mn due to the fume-generated amount and the increase of the metal element Fe due to the formation of the unstable metal surface were very considerable.

As described above, a stainless steel pipe joined by the butt welding with partial penetration according to the present invention did not come up to the base metal itself, however the degrees of surface contamination, fume generation and also the degree of formation of unstable metal surface were sharply decreased compared to the stainless steel pipe joined by the conventional butt welding with complete penetration. Especially, the decrease of fume generated amount were very considerable. Thus, it was identified that the stainless steel pipe joined by the welding with partial penetration forming the solid-state joining portion S according to the present invention has superior corrosion resistance to the stainless steel pipe joined by the conventional welding with complete penetration.

As described above, the stainless steel pipe joined by the butt welding with partial penetration according to the present invention is remarkably excellent compared to the stainless steel pipe joined by the conventional butt welding with complete penetration especially from the point of view of the decrease of particle generation and the increase of corrosion resistance. Furthermore, since there exists no dead space in the stainless steel pipe joined by the butt welding with partial penetration different from the pipe joined by the conventional butt welding with complete penetration, unreasonable problems such as gap corrosion or contamination of supplied gas flow caused by the existence of a dead space does not occur.

Moreover, in the above-mentioned embodiment the stainless steel pipe having an outer diameter of 9.53 mm(⅜ inch's pipe) and a thickness of 1 mm was described but the present invention is not limited to this pipe having thin thickness but applicable to a pipe having a thickness of various dimensions and can be appropriately used especially in a stainless steel pipe. For example, even in case of a pipe having a thick thickness and a diameter of 250A(267.4 mm) and a schedule of 10S(thickness 4 mm) which is very difficult to be welded in one layer, it is possible to obtain a stainless steel pipe according to the present invention having solid-state joining portion by groove in V-shaped, U-shaped or L-shaped, and making the dimension of the unmelted butt joining portion among the butt joining portion below 0.7 mm from the inner wall surface portion toward the outer wall surface portion and then by joining through the butt welding with partial penetration according to the present invention.

In the above-mentioned description, the terminology "pipe" was used in a meaning including a straight pipe, an elbow-shaped pipe and a T-shaped pipe.

The stainless steel pipe and joining method thereof according to the present invention are carried out in the above-mentioned manner and have the following advantages.

That is to say, in joining stainless steel pipes to each other by butt welding, by leaving the inner wall surface portion of the pipe unmelted and by forming the unmelted butt joining portion having length of over 0 mm and below 0.7 mm from the inner wall surface portion toward the outer wall portion where the thickness of the pipe is more than 1 mm, and by forming the unmelted butt joining portion having length of over 0% and below 70% of a pipe thickness from inner wall surface portion toward the outer wall portion when the thickness of the pipe is less than 1 mm and by carrying out partial penetration welding, the unmelted joining portion may be formed in a solid-state joining portion and there exists no fusion zone in the inner wall surface of the pipe and since there exists no dead space, it is possible to obtain a pipe having the firm solid-state joining portion superior to the joining portion by the conventional welding method with complete penetration.

Furthermore, since the fusion zone does not reach the inner wall surface of the pipe, generation of fume within the pipe may be prevented and contamination due to impurities within the pipe may be avoidable. Furthermore, since direct heat affection by heating does not reach the inner wall surface of the pipe, the corrosion resistance of the inner wall surface of the pipe is prevented from being deteriorated to thereby maintain a good corrosion resistance for a long time.

Thus, the stainless steel pipe according to the present invention may prevent a gas from being contaminated by impurities and may supply a gas having a high degree of purity for manufacturing a semiconductor which needs to be supplied with a gas without impurity, to thereby be utilized very effectively. Specially, the pipe according to the present invention has a superior effect capable of supplying the semiconductor manufacturing industry which is highly integrated day by day with a gas of a high degree of purity.

What is claimed is:

1. A stainless steel pipe joined by a butt welding, the stainless steel pipe comprising:
    a joining portion having a butt joining portion, the butt joining portion having
        an outer butt joining portion in an outer wall surface portion joined with penetration; and
        an inner butt joining portion in an inner wall surface portion joined in solid-state without being melted
    such that the joining portion comprising the butt joining portion is joined by the butt welding with partial penetration, said inner wall surface portion joined in solid state includes an unmelted portion of dimension $t_s$ where $0 < t_s \leq 0.7$ mm where $t_s$ is measured from an inner wall surface as a reference surface toward an outer wall surface when pipe thickness is more than 1 mm.

2. A joining method of a stainless steel pipe comprising the acts of:
    attaching butt joining portions of stainless steel pipes to be joined; and
    welding at a welding speed in a range of 50 to 300 mm/min the butt joining, portions under back shield gas atmosphere or vacuum surrounding such that
    inner wall surface portions of the butt joining portion are joined in solid-state without being melted and
    outer wall surface portions of the butt joining portion are joined with penetration.

3. The joining method of claim 2, wherein a content of an oxidative gas is less than 10 ppm under back shield gas atmosphere or vacuum surrounding.

4. A stainless steel pipe joined by a butt welding, the stainless steel pipe comprising:
    a joining portion having a butt joining portion, the butt joining portion having
        an outer butt joining portion in an outer wall surface portion joined with penetration; and
        an inner butt joining portion in an inner wall surface portion joined in solid-state without being melted such that the joining portion comprising the butt joining portion is joined by the butt welding with partial penetration, said inner wall surface portion joined in solid state includes an unmelted portion of dimension $t_s$ where $0 < t_s \leq 0.7t$ mm where $t_s$ is measured from an inner wall surface as a reference surface toward an outer wall surface when pipe thickness is less than 1 mm.

* * * * *